Aug. 13, 1957     S. HILLMAN     2,802,224
AUTOMATIC NUT TAPPING MACHINE HAVING TOOL SPINDLES
AND WORK HOLDERS MOVABLE IN A CIRCULAR PATH
Filed June 17, 1955     7 Sheets-Sheet 1
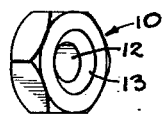
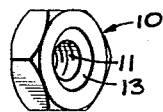
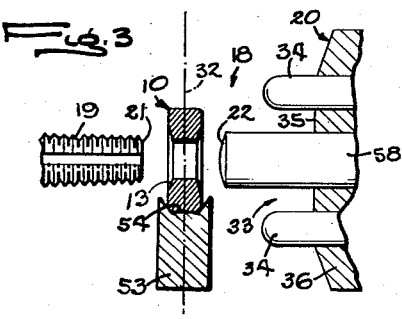
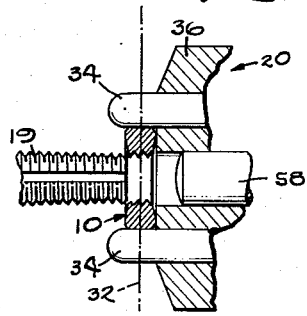
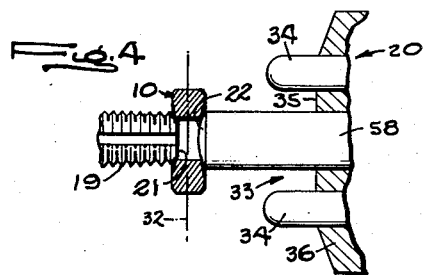
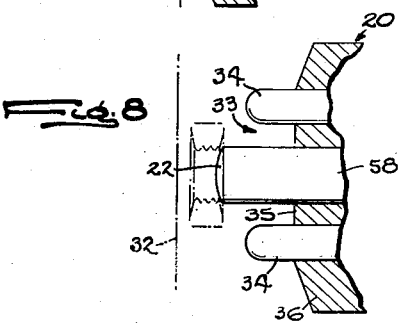
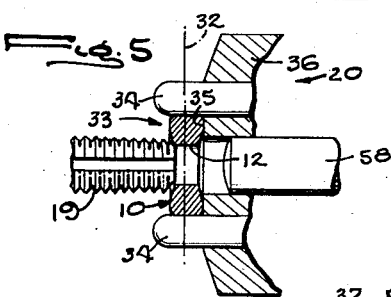
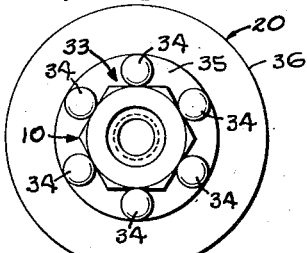
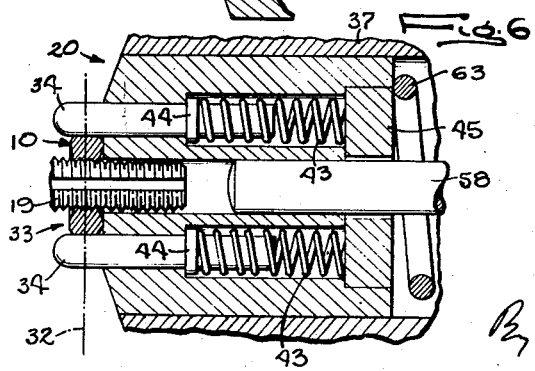
INVENTOR
Swan Hillman
ATTORNEYS

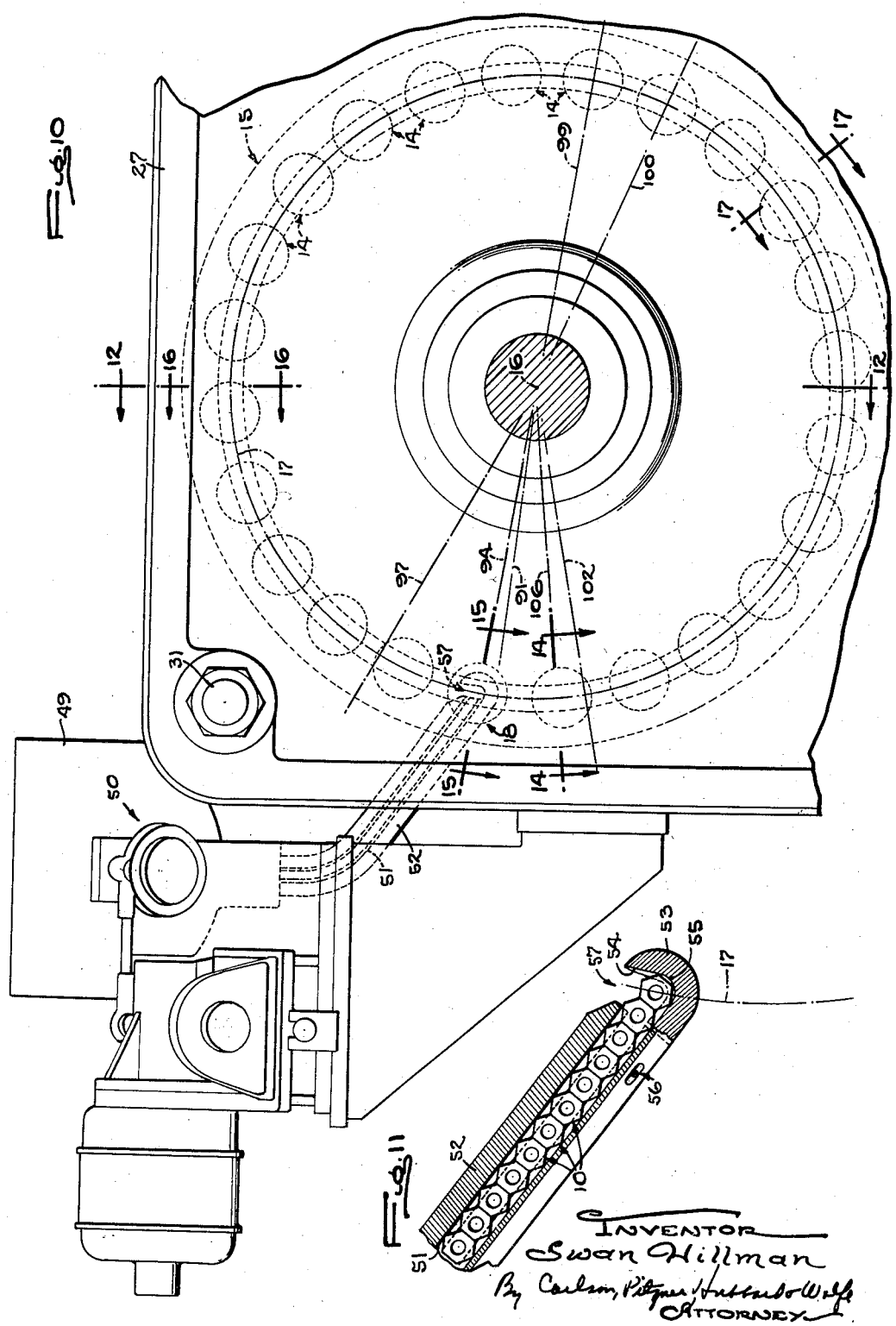

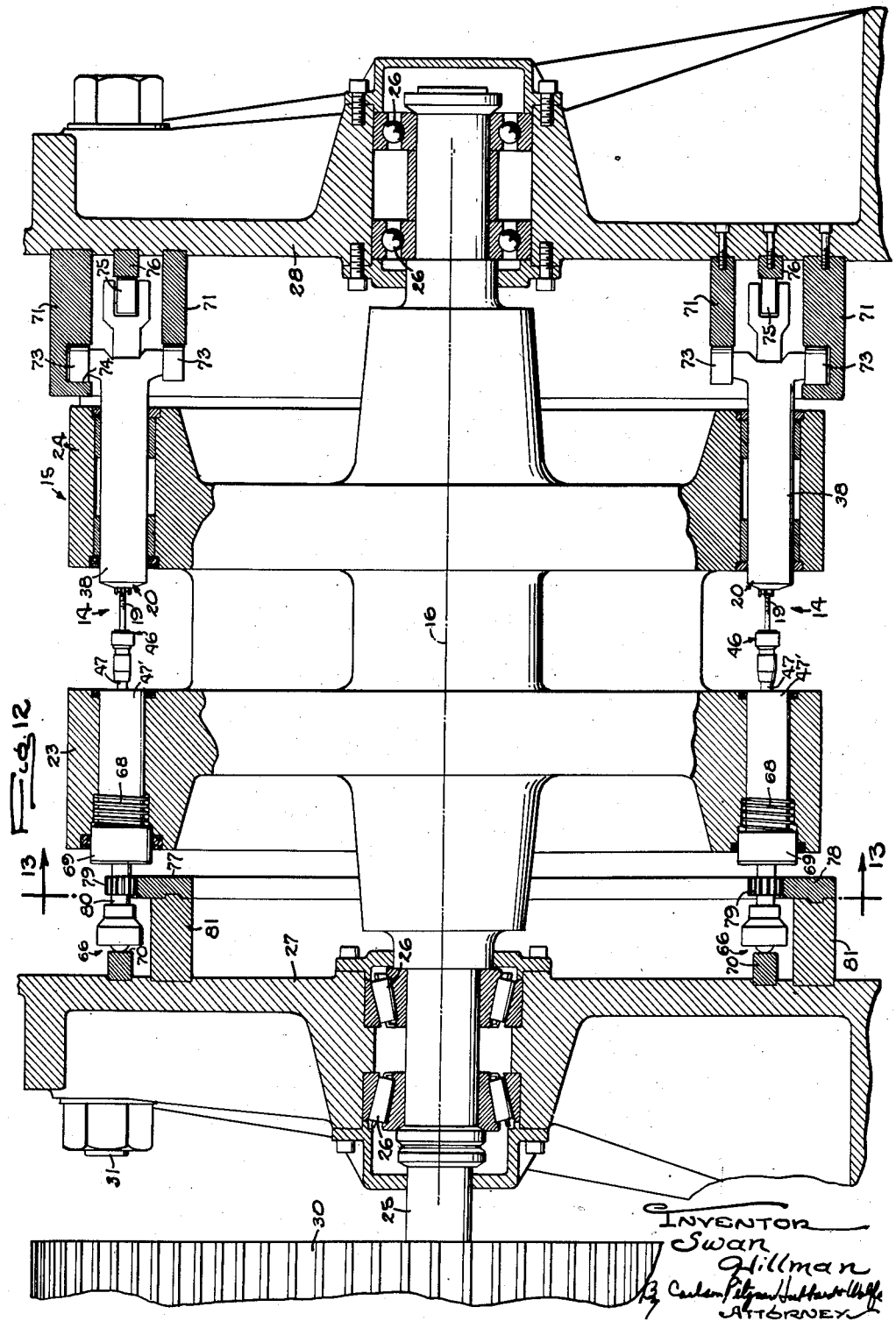

Fig. 13

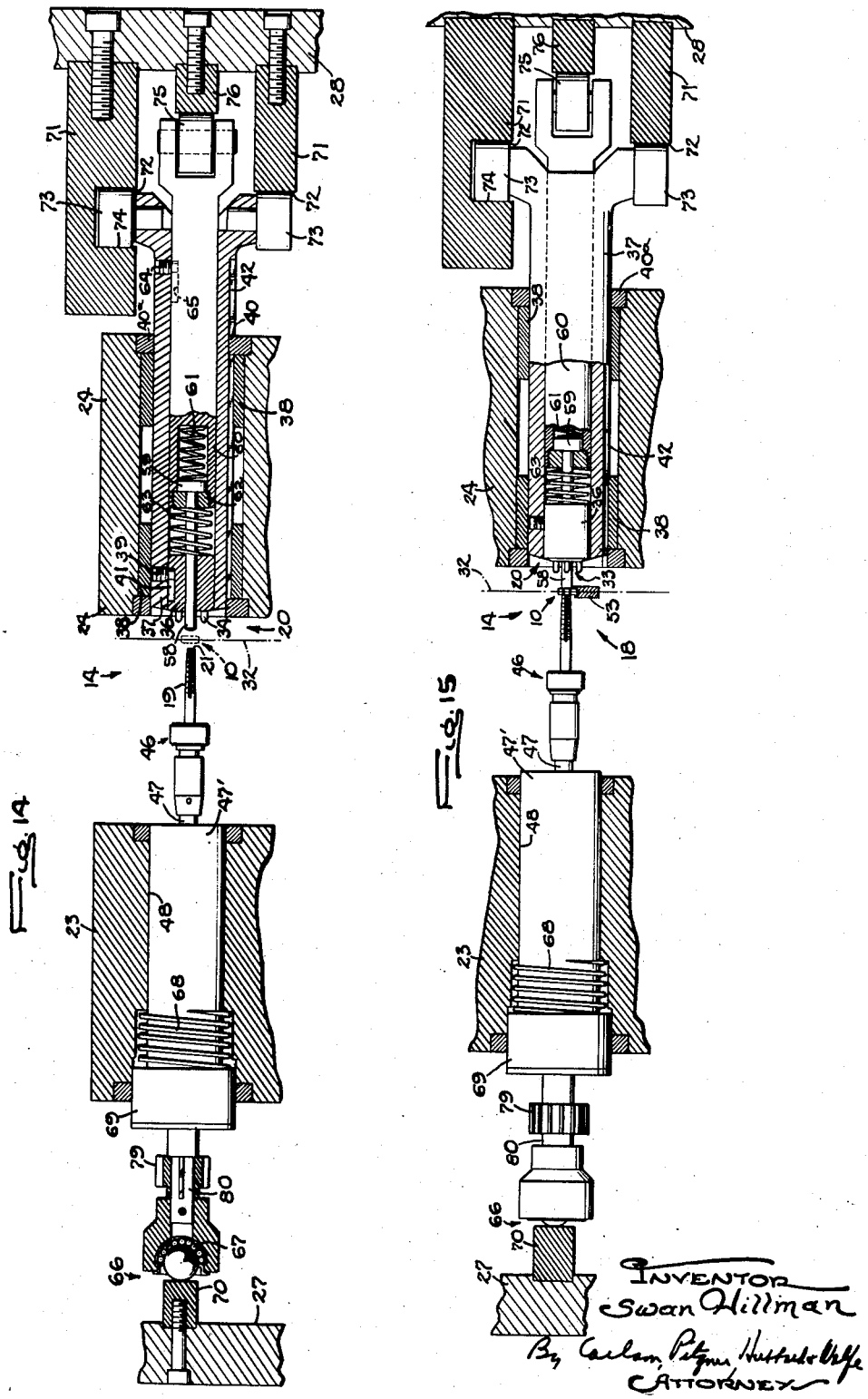

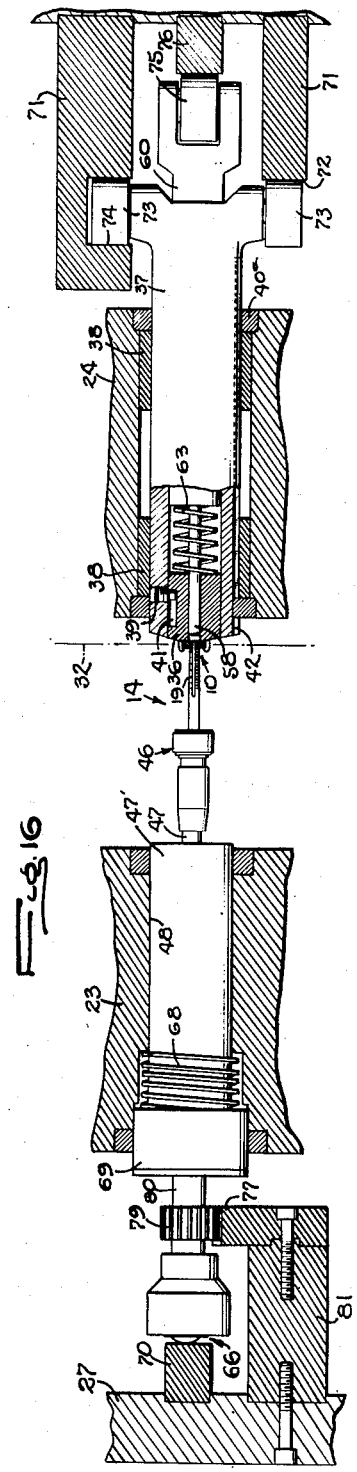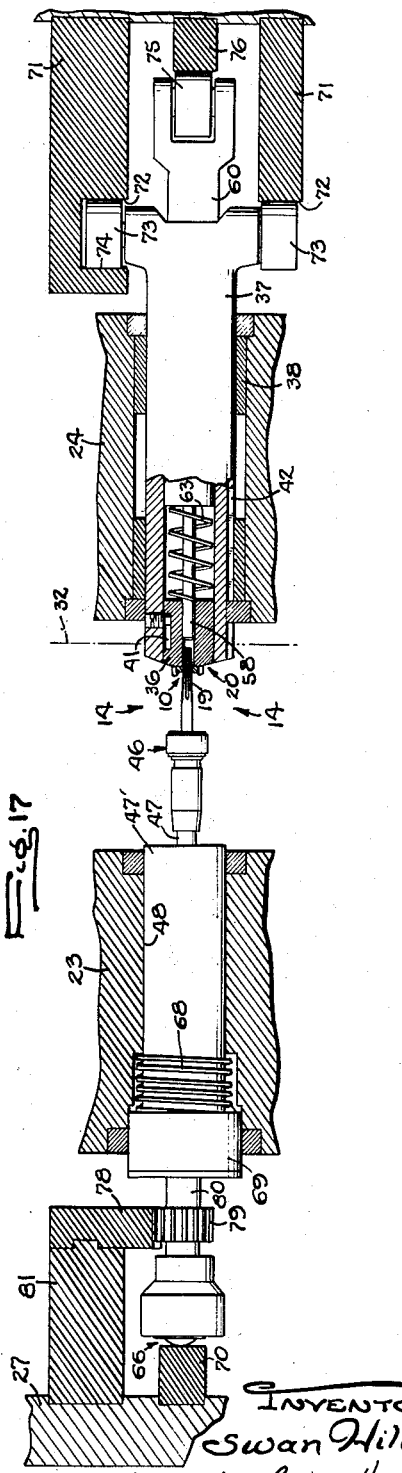

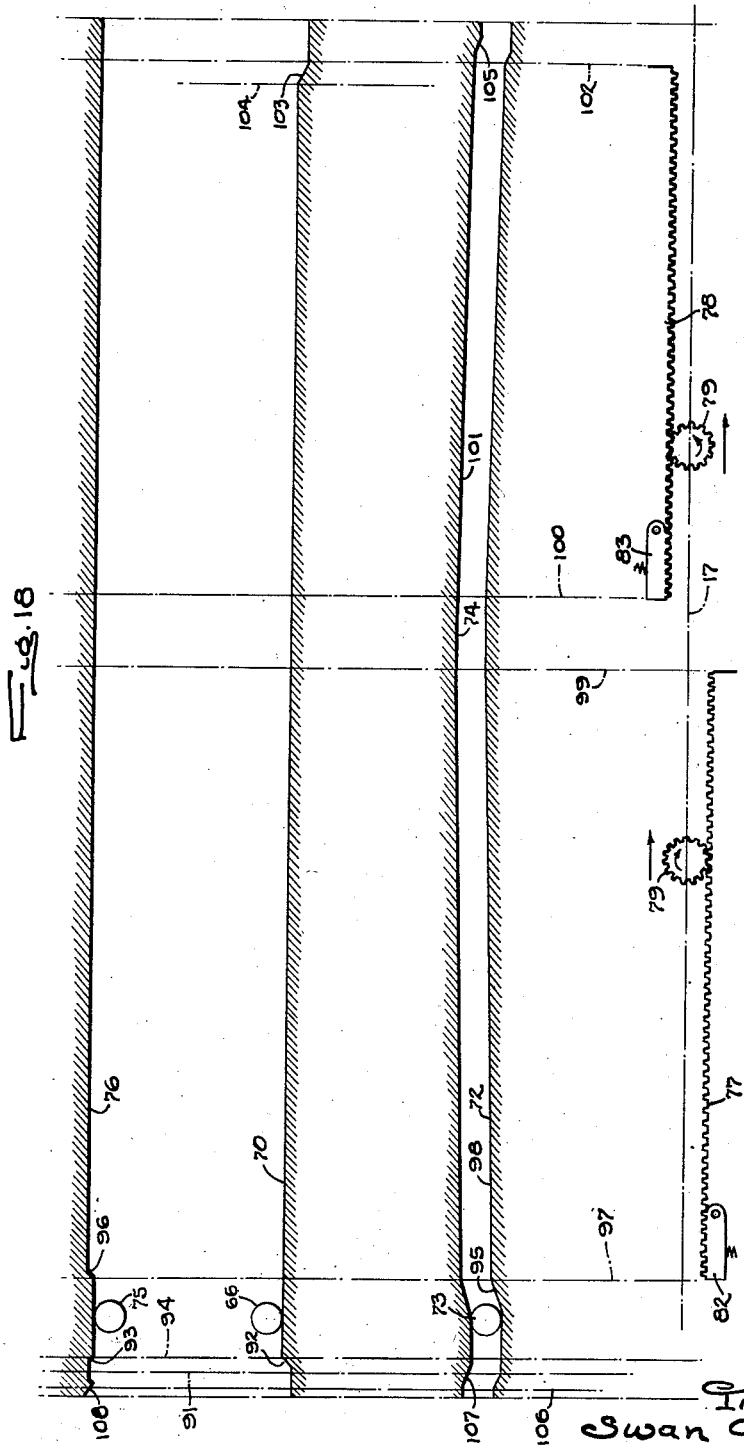

United States Patent Office 2,802,224
Patented Aug. 13, 1957

2,802,224

AUTOMATIC NUT TAPPING MACHINE HAVING TOOL SPINDLES AND WORK HOLDERS MOVABLE IN A CIRCULAR PATH

Swan Hillman, Rockford, Ill.

Application June 17, 1955, Serial No. 516,065

7 Claims. (Cl. 10—132)

This invention relates to machines for tapping nuts, particularly those of the type in which the blanks are hopper fed into operative engagement with taps angularly spaced around a common rotary carrier and operating simultaneously on different blanks.

One object is to arrange a plurality of tapping and chuck units around a rotary carrier and to utilize the turning of the carrier in novel ways in automatically picking up successive blanks from the hopper chute, chucking the held blanks and imparting the required relative angular and axial movements to the tap and chuck of each unit for tapping each blank and then releasing it from the carrier.

A further object is to provide a novel mechanism for transferring successive nut blanks from a fixed loading position onto the rotary carrier in proper relation with respect to the chuck and tap of the successive tapping units.

Other objects and advantages of the invention will become apparent from the following detailed description taken in connection with the accompanying drawings, in which—

Figure 1 is a perspective view of a nut blank adapted to be operated upon in accordance with the present invention.

Fig. 2 is a perspective view of the finished nut.

Figs. 3 to 8 are fragmentary diametrical sectional views showing the tools of a machine embodying the novel features of the invention, the tools being shown in different positions in the successive views.

Fig. 9 is an end view of the chuck and a nut blank seated therein.

Fig. 10 is a side elevational view of the machine with certain parts broken away.

Fig. 11 is a fragmentary sectional view of the chute for the blanks.

Fig. 12 is a fragmentary sectional view taken along the line 12—12 of Fig. 10.

Fig. 13 is a sectional view taken along the line 13—13 of Fig. 12.

Figs. 14, 15, 16, and 17 are fragmentary cross sectional views of the tools and actuators therefor when in the positions indicated by the lines 14—14, 15—15, 16—16, and 17—17 of Fig. 10.

Fig. 18 is a combined cam development view and time chart.

The invention is shown in the drawings incorporated in a machine for automatically picking up individual nut blanks 10 and tapping the same to form a screw thread 11 around the center hole 12 therein. The periphery of each blank is trimmed to a polygonal contour with six sides in the present instance. Shallow frustoconical recesses 13 in opposite faces of the blank are centered relative to the axis of the hole 12 and converge inwardly from a diameter only slightly smaller than the hexagonal periphery.

Figure 13:
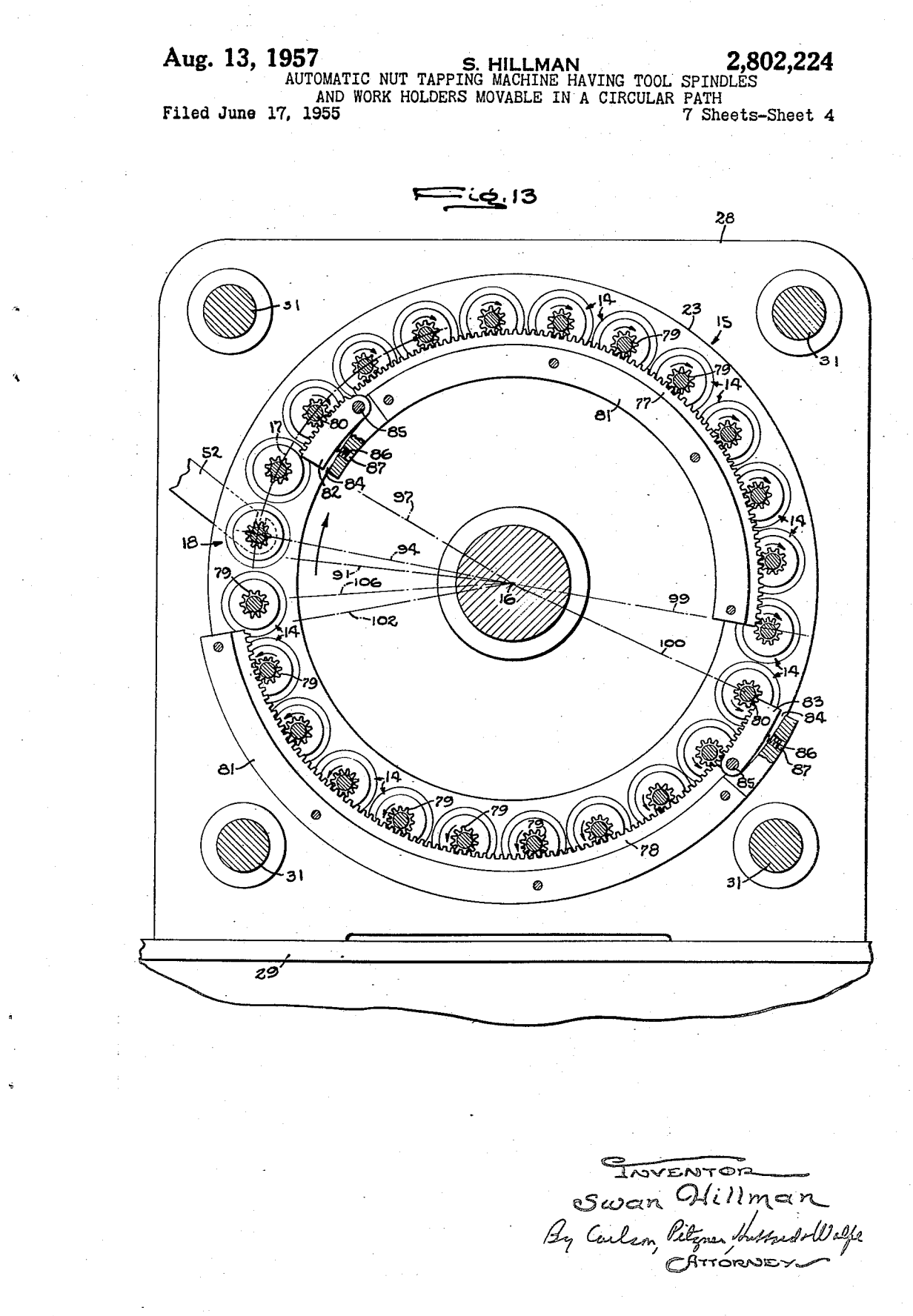

The improved tapping machine comprises generally a plurality, twenty-four in the present instance, of combined pick-off and tapping units 14 angularly spaced around a drum-like carrier 15 which rotates continuously about an axis 16 to move each unit 14 bodily in a cylindrical path 17 (Figs. 10 and 13) during which each unit is actuated to successively pick up a nut blank 10 in a loading position 18 (Figs. 3 and 11), center the blank (Fig. 4), chuck the centered blanks (Fig. 5), tap the hole therein (Fig. 6), screw the blank off from the tap (Fig. 7), and finally release the completed nut (Fig. 8). To facilitate hopper feeding of the nut blanks into the loading position and release of the finished nuts, the axis 16 of the carrier is preferably disposed horizontally.

Each of the units 14 comprises a tap 19 and a chuck 20 concentric and alined axially with gripping or pick-off elements 21 and 22 which are mounted for axial and rotary motion relative to each other and the carrier 15. The different motions for each of twenty-four units are performed by common actuators which utilize the turning of the carrier not only as a source of power but also to time each motion in relation to the other functions of the tapping unit.

The carrier 15 comprises two heavy disks 23 and 24 (Fig. 12) keyed rigidly to a shaft 25 which is journaled in bearings 26 mounted in rigid parallel plates 27 and 28 upstanding from and secured to a base 29 (Fig. 13) beyond opposite ends of the carrier. At their corners, the plates are joined together by heavy tie bolts 31. Fast on one end of the shaft is a gear 30 driven from a suitable source of power to turn the carrier at the desired speed, for example 20 R. P. M.

The chuck 20 of each tapping unit 14 is constructed in a novel manner to facilitate entry of a nut blank 10 during rotation of the carrier 15 and to hold the blank against turning during the tapping operations. The chuck is disposed on one side of a transaxial or medial plane 32 through the loading position 18 with its axis lying on the cylinder 17 and paralleling the carrier axis 16 and is formed with a socket 33 (Fig. 3) opening toward the plane and adapted to receive a blank 10 by relative axial movement of the two and then hold the seated blank against turning. To avoid the trapping of chips within the chuck, the sides of the socket 33 preferably are defined by a plurality of jaws projecting axially from a flat wall 35 of the chuck body 36 at the bottom of the socket and angularly spaced in an annular series concentric with the chuck axis. Radial openings between the jaws receive the corners of the blank (Fig. 9) and permit gravitation of the chips or shaving away from the socket while, at the same time, holding the blank against turning.

For handling hexagonal blanks 10, six jaws 34 are employed each being a pin projecting axially from the chuck body 36 in parallelism with the chuck axis and spaced angularly around the latter equal distances from adjacent pins. The body 36 is cylindrical and is slidable axially in the inner end of a sleeve 37 (Fig. 14) which is slidable in bushings 38 in one carrier disk 24. For a purpose to appear later, a screw 39 (Fig. 14) threaded through the sleeve 37 extends into a slot 41 formed in the chuck body 36 to limit axial movement of the latter and hold the same against turning relative to the sleeve. The sleeve in turn is held against rotation relative to the carrier by a lug 40 (Fig. 14) extending radially and inwardly into a slot 42 in the sleeve from a ring 40ª pressed into a counterbore of the disk 24.

To compensate for angular misalinement of the socket 33 and a blank 10 and avoid cocking or binding of the latter as it is seated by axial shifting into the socket, the outer ends of the jaw pins 34 are rounded as shown to engage the peripheral edges of the blank and guide the same into angular registry with the socket. Also, each pin is slidable endwise in the chuck body 36 and is yieldably urged outwardly by a spring 43 (Fig. 6). The latter encircles the inner end of the pin within a counterbore of the body and acts between an enlarged head 44 intermediate the ends of the pin and a plug 45 in the outer end of the body, the head contacting the body at the inner end of the counterbore to limit outward movement of the pin.

The tap 19 of each chucking and tapping unit 14 is secured in a tapping chuck 46 on the opposite side of the medial plane 32 from the body 36 of the nut blank chuck 20 and in alinement axially with the latter. The tapping chuck is carried by a spindle 47 which is journaled in a sleeve 47' slidable axially in a bore 48 of the other carrier disk 23, the tap thus being rotatable about the axis of the unit and slidable axially toward and away from the medial plane.

Nut blanks 10 to be tapped are delivered automatically one by one into the loading position 18 which is passed by the tools of each chucking and tapping unit 14 when the tools are separated on opposite sides of the medial plane. For this purpose, a supply of blanks is stored in a hopper 49 (Fig. 10) and, by agitating and alining mechanism 50 of well-known construction, the blanks are ararnged in edge to edge relation and delivered by gravity into a guideway 51 (Figs. 10 and 11). The latter is disposed within an elongated chute 52 which projects downwardly into the upper part of the tool path 17 on the rising side thereof. In this instance, the guideway is slightly wider than the maximum diameter of the blanks which arrange themselves with the flat edges of their peripheries in abutment as shown in Fig. 11.

At its lower end, the guide 51 is closed by a stop 53 (Fig. 11) whose active surface 54 is flat at one end and extends a short distance along the cylindrical tool path 17 tangentially thereof. By merging the other end of the stop surface with the outer guide wall along a properly curved surface 55, the axis of the terminal blank will always occupy the same position relative to the stop surface, the curved surface 55 herein lying on a circle of the same size as the circle through the corners of each blank. A pin and slot connection 56 permits the stop to be adjusted so as to bring the axis of the terminal blank into precise coincidence with the cylindrical tool path 17. The stop 53 and the lower end of the chute 52 are relatively narrow and the stop surface 54 preferably is shaped to mate with the tapered periphery of the blank and hold the same accurately in the medial plane 32 as shown in Figs. 3 and 15.

To permit the terminal blank 10 resting against the stop surface 54 to be picked off by the gripping elements 21 and 22 and transferred out of the loading position 18, one wall of the guideway 51 is terminated short of the stop surface by an amount greater than the diameter of the blank to form a circumferential opening 57 (Figs. 10 and 11) facing in the direction of turning of the carrier 15. It will be apparent that, when the terminal blank has been gripped and shifted out of the chute 52 through the opening 57, the entire row of blanks will gravitate downwardly through the chute until another blank is disposed in the loading position against the stop surface 54 with one of its flat peripheral edges in face to face abutment with the next adjacent blank. In this way, another blank is fed into the loading position as soon as the leading blank is removed so as to provide an automatic hopper feed. Due to a slight inclination of the chute and the row of blanks upwardly from a radius of the carrier through the loading position 18 as shown in Figs. 10 and 11, shifting of the terminal blank is accompanied by a slight upward shaft of the row of blanks before the latter gravitate downwardly.

The gripping elements 21 and 22 of each tapping unit 14 above referred to for entering the blank recesses 13, gripping the blank 10, carrying the same out of the loading position 18 are, in this instance, formed by the axially alined end portions of the tap 19 and an ejector pin 58 concentric with the chuck 20. These ends are tapered to fit into the recesses so that the elements, in addition to gripping the blanks and carrying the same out of the chute 52, also coact with the walls of the recesses 13 to aline the picked-off blank axially with the chuck socket 33 and the tap. Herein, the tapered ends are blunt, the ejector element 22 being rounded and the tap tapering to a flat end which may be formed simply by grinding off the pointed end of a commercially available tap.

The ejector pin 58 (Figs. 14 and 15) is slidable in an axial bore of the chuck body 36 and an enlarged head 59 on its inner end is guided in a bore of a pusher rod 60 slidable in the outer end of the chuck supporting sleeve 37. A spring 61 acts between the pusher rod and the head to urge the pin outwardly to a limit position determined by abutment of the head with a plug 62 threaded into the pusher rod. Another spring 63 encircling the ejector pin acts between the plug and the chuck body 36 to urge the latter outwardly, such movement being limited by the screw 39 in the sleeve 37. Another screw 64 threaded into the latter extends into a slot 65 in the pusher rod 60 (Fig. 14) to prevent relative turning of the rod and the sleeve.

The operation of each chucking and tapping unit 14 during continuous rotation of the carrier may be described generally as follows. As the unit approaches the loading position 18, the pick-off elements 21 and 22 and the chuck 20 are retracted on opposite sides of the medial plane 32 as shown in Figs. 3 and 14. When the pick-off elements have passed the stop 53, they are projected axially toward each other, simultaneously in this instance, and into the recesses 13 of the terminal blank 10 whereby to pick up the blank and carry the same edgewise through the opening 57 and away from the chute 52 and finally hold the blank in axial alinement with the chuck as shown in Figs. 4 and 15. The chuck and the pick-off elements then are shifted axially relative to each other to seat the blank in the socket 33 and against the bottom wall 35 thereof as shown in Fig. 5. Next, the tap and the chuck first are relatively turned in one direction and fed axially toward each other in synchronism to tap the hole 12 in the chucked blank (Figs. 6 and 16) and then are turned in the opposite direction and retracted axially in synchronism to unthread the nut from the tap (Figs. 7 and 17). During such tapping and untapping, the ejector pin 58 is retracted axially within the chuck body to avoid interference with the tap (Figs. 5, 6, 7, 16, and 17). The chuck and tap then are separated and the ejector 58 and the chuck are relatively shifted to project the ejector beyond the chuck jaws 34 to eject the finished nut as shown in Fig. 8, the nut then dropping from the rotary carrier. Finally, all of the parts are shifted to their initial positions spaced from the medial plane 32.

In accordance with an important aspect of the invention, the rotary motion of the carrier 15 is utilized to produce all of the relative motions, both axial and rotary, of the tools of each chucking and tapping unit 14 in the proper timed relation to each other. To this end, stationary actuators are spaced angularly around opposite ends of the carrier for operation successively on each unit as the latter moves around the cylindrical path 17 with the carrier.

The angular motion of the carrier 15 is converted to relative axial movements of the parts of each unit 14 by stationary cams supported by the frame plates 27 and 28 and having axially facing surfaces cooperating with followers on the respective tools of each unit. In the case of the tap 19, the follower 66 is a ball seated in ball socket 67 (Fig. 14) carried by the outer end of the spindle 47, a spring 68 acting between the carrier disk 23 and an enlarged portion 69 of the sleeve 47' to urge the latter and the spindle 47 outwardly and the ball against an arcuate cam bar 70 bolted against the inner side of the adjacent frame plate 27. The axial position of the chuck 20 is determined by two cam bars 71 each having inwardly facing surfaces 72 contacted by follower rollers 73 on the outer end of the chuck supporting sleeve 37 for advancing the chuck and one having an outwardly facing surface 74 cooperating with one of the rollers 73 to retract the chuck. These two bars 71 are bolted against the inner face of the other frame plate 28. A follower roller 75 carried by the outer end of the pusher rod 60 is urged by the spring 63 against an arcuate cam bar 76 secured to the inner side of the adjacent frame plate 28 between the cam bars 71 for the chuck.

Conversion of the rotary carrier motion to relative rotation of the chuck 20 and the tap 19 is effected in a novel manner by two arcuate rack bars 77 and 78 extending along successive arcs of the cylindrical tool path 17 and cooperating with gear means 79 on each tapping unit 14 as the latter moves around such arcs. While relative rotary movement of the tap and the chuck may be obtained by turning either or both of these parts relative to the carrier 15, it is preferred to rotate the tap and retain the chuck against turning as described above. Thus, the angular position of the chuck relative to the carrier 15 is always the same as it passes the loading position 18, the angular position being one of approximate registry of the socket 33 and the terminal blank 10 in the chute 52 so as to facilitate chucking of the blank.

In the present instance, the gear means 79 on each tapping unit 14 comprises a single spur gear adapted to mesh with both rack bars 77 and 78 and keyed to a reduced portion 80 of the spindle 47 (Fig. 14) between the carrier disk 23 and the follower ball 66 on the outer end of the spindle. The first arcuate rack bar 77 beyond the loading position 18 is formed with teeth which face radially and outwardly and extend along an arc concentric with but spaced inwardly from the tool path 17 (Fig. 13) to mesh with the gear 79 of each spindle. The teeth of the second bar 78 face radially and inwardly along an arc spaced angularly from the first bar and concentric with but spaced outwardly from the tool path. Herein, each rack bar is secured to the adjacent frame plate 27 and is located in the plane of the gears 79 through the medium of arcuate blocks 81 (Figs. 12, 13, 16, and 17) bolted to the plate and the bars.

To insure that each of the gears 79 meshes properly with each of the rack bars 77 and 78 upon initial engagement therewith, the end portions of the racks first engaged by the gears are formed as separate segments 82 and 83 (Fig. 13) having teeth normally alined with the teeth on the remaining portions of the racks but yieldable radially thereof. Herein, the entering end portion of each rack is cut away as indicated at 84 to receive the segment and the latter is pivoted at its inner end at 85 on the rack for swinging of its outer end into and out of alinement with the remainder of the rack. A spring 86 secured to a plug 87 threaded into the rack abuts an intermediate portion of the segment to position the latter in alinement with the rack while permitting the segment to yield radially and inwardly upon engagement by a gear.

Operation

The operation of the machine will now be detailed with particular reference to Fig. 18 which is a development of the cams 70, 71, and 76 and the rack bars 77 and 78 and Figs. 3 to 8, 10, 13, and 14 to 17 which show successive steps in picking one nut blank out of the loading position 18, chucking the same, and completing the tapping and unthreading of the blank. Assuming that the tool carrier 15 is turning clockwise as viewed in Figs. 10 and 13 and that the pick-off elements 21 and 22, the tap 19 and the chuck 20 of one of the gripping and tapping units 14 are moving upwardly around the path 17 and are approaching the loading position 18, the various followers will be engaging dwell surfaces of the cams along the line 91 (Figs. 10, 13, and 18) and the spur gear 79 is out of mesh with both rack bars. At this time, both pick-off elements 21 and 22 are separated and the elements and the chuck 20 are spaced from the medial plane 32 (Figs. 3 and 14) to pass on opposite sides of the stop 53 on the chute 52.

In the continued rotation of the carrier 15 and just as the axis of the unit 14 has passed the outer edges of the recesses 13 of the blank 10 then in the terminal position against the stop surface 54, the followers 66 and 75 encounter abrupt rises 92 and 93 on the cams 70 and 76 to initiate advance of the tap 19 and the ejector rod 58. Before the axis of the tools pass beyond the far edges of the recesses, the pick-off elements 21 and 22 at least partially enter the recesses and continue on to the fully seated positions shown in Figs. 4 and 15 thereby camming the blank into precise axial alinement with the axis of the tools. The locations of the followers on their respective cams at this time is represented by a line 94 in Figs. 10, 13 and 18. The blank is thus picked up by the tool set and carried along the stop surface 54 out of the chute 52 through the opening 57.

When the axis of the unit 14 has passed beyond the stop 53 and while the blank 10 is still held by the pick-off elements in the transaxial plane 32, the followers 73 engage rather abrupt rises 95 on the cam surfaces 72 for advance of the chuck 20 axially toward the plane and the blank. Should the socket 33 and the periphery of the blank register exactly, the chuck pins 34 will pass between the corners of the blank so that the latter is seated in the socket. In the event of angular displacement of the blank and the socket, the rounded ends of the pins 34 engage the peripheral edges of the blank adjacent the corners and tend to turn the blank and guide the same into registry with the socket as permitted by gripping of the blank at its center by the pick-off elements. During such turning of the blank relative to the chuck and before registry of the two, the pins may yield axially and into the chuck body against the force of their springs 43 thereby avoiding locking or binding of the blank and the pins.

During advance of the chuck and all through the tapping operation, the tap 19 remains in the same advanced position adjacent the transaxial plane 32 as shown in Figs. 4, 5, 6, and 7. As soon as the chuck has advanced far enough to bring the other end 35 of the body 36 into contact with the blank at the bottom of the socket 33, the follower 75 rolls down a fall 96 and onto a dwell of the cam 76 for retraction of the pickup rod 58 behind the bottom wall 35 of the socket to the position shown in Fig. 5 where it remains throughout the tapping operation. At the same time represented by a line 97 in Figs. 10, 13, and 18, the spur gear 79 of the unit engages the pivoted segment 82 of the inner rack bar 77 to turn the tap relative to the chuck. If, by this time, the blank still does not register the socket 33 and the pins 34 are pressed into the chuck body 36, the tap tends to turn the blank into such registry thereby permitting the pins to snap out between the corners of the blank to hold the same against rotation relative to the chuck.

At the same time that the bottom wall 35 of the chuck socket 33 contacts the blank 10 and the spur gear 79 engages the pivoted segment 82, the followers 73 roll from the abrupt rises 95 to gradual rises 98 of the cam surfaces 72 to advance the chuck 20 and feed the blank axially onto the tap 19 in synchronism with turning of the latter to form the threads 11 properly. That is, the tap is advanced axially a distance equal to the pitch of the threads during each revolution of the tap. The chuck continues to advance beyond the transaxial plane 32 to its most advanced position shown in Fig. 6, the followers 73 and the gear 79 then will be disposed approximately along the line 99 of the Figs. 10, 13 and 18. Beyond these positions, the followers encounter dwells on the cam surfaces 72 and 74 and the gear moves out of mesh with the inner rack bar 77 and into mesh with the pivoted segment 83 of the outer rack bar 78 to rotate the tap in the opposite direction for unthreading the nut.

At this same time as indicated along the line 100 of Figs. 10, 13 and 18, one of the followers 73 encounters a gradual rise 101 of the cam surface 74 for drawing back the chuck in synchronism with reverse rotation of the tap, that is, a distance equal to the thread pitch for each revolution of the tap. Just before the gear 79 rolls out of mesh with the rack bar 78, the follower 66 encounters a fall 103 along a line 104 to retract the tap 19. This condition just before retraction of the tap is shown in Fig. 7.

By the time the gear 79 rolls out of mesh with the outer rack bar 78 along a line 102, the finished nut 10 is completely unthreaded from the tap and the chuck is in its position occupied just before the tapping began. Continued rotation of the carrier 15 brings the follower 73 against an abrupt rise 105 and onto a dwell of the cam surface 74 to retract the chuck from the transaxial plane to the position shown in Fig. 8 and indicated along the line 106. At the latter, the follower 66 encounters another abrupt rise 107 of the cam surface 74 to retract the chuck farther to its starting position and the follower 75 encounters a short node 108 of the cam 76 to project the pick-up rod 58 beyond the bottom wall 35 of the socket 33 momentarily before the follower engages the dwell surface along the starting line 91. During this relative axial movement of the chuck and the rod, the latter ejects the finished nut out of the socket from which it gravitates to a suitable collection receptacle (not shown) beneath the ejecting position. The rod 58 thus is utilized not only as a pick-off element at the loading station 18, but also as an ejector for unchucking the finished nut.

The relative movements above described are repeated for each of the tools of each unit 14 as the latter passes round the stationary cams and rack bars which serve all of the units. It will be seen that twenty-four blanks are tapped in each revolution of the carrier 15. Thus, by turning the latter at a speed of 20 R. P. M., which has been found to be feasible in practice, 480 nut blanks may be handler per minute.

I claim as my invention:

1. A machine for tapping the holes in polygonal nut blanks having coned recesses in opposite sides, said machine having, in combination, a carrier continuously rotatable about a horizontal axis, a plurality of gripping and tapping units mounted on said carrier parallel to said axis and spaced apart equidistantly therearound, each of said units comprising opposed pick off and holding elements mounted for axial movement toward and away from a transaxial plane of the carrier and a tap and a chuck concentric with the axis of the respective elements, said chuck forming a socket for receiving and holding one of said blanks, a chute supporting a row of said blanks with the terminal blank disposed in said plane between the pick off elements of each pair and on the cylinder traversed by the axis of the elements, said chute having an opening facing circumferentially of said carrier to permit release of said terminal blank, mechanism operable in timed relation to the rotation of said carrier to project said elements into the recesses of said terminal blank, chuck the picked up blank in said socket and feed the tap and chuck axially relative to each other in opposite directions, and mechanism common to said units for converting the rotary motion of said carrier to relative turning of said tap and said chuck of each unit in opposite directions and in synchronism with said relative axial movement thereof to tap the hole in the chucked blank.

2. In a machine for tapping polygonal blanks having inwardly converging recesses in opposite sides, the combination of, means supporting and advancing a row of said blanks to a predetermined terminal position in a plane, a carrier rotatable unidirectionally about an axis paralleling the axis of the blank in said terminal position, said supporting means having an opening facing circumferentially of said carrier to permit release of the terminal blank, alined gripping elements mounted on said carrier on opposite sides of said plane for axial movement toward and away from said plane and for transverse movement with the carrier through a position of axial alinement with said terminal blank, a chuck surrounding one of said elements and having a multi-sided socket which complements and registers with the periphery of said terminal blank when passing said terminal position, mechanism operable in synchronism with the turning of said carrier to project the ends of said elements into the recesses of said terminal blank and thereby remove the blank from said terminal position and thereafter shift said elements and said chuck axially relative to each other to seat the picked-up blank in said chuck socket, a tap mounted on said carrier in alinement with said chuck, and mechanism operable in the continued turning of said carrier and after seating of a blank in said socket to covert the unidirectional rotary movement of said carrier to relative rotary and axial movements of said tap and said chuck to tap the hole of the chucked blank and remove the latter from the tap.

3. In a machine for tapping nut blanks, the combination of, a frame, a carrier rotatable thereon, a plurality of tapping units paralleling and angularly spaced around said carrier and traversing a cylindrical path concentric with the carrier axis, each of said units comprising axially spaced relatively rotatable tap and chuck members relatively movable axially, a pair of arcuate racks mounted on said frame concentric with said axis and extending along successive arcs of said path with the teeth of the racks facing toward the path, gear means coupled to the rotatable ones of said members and meshing successively with the teeth of said racks during turning of the carrier whereby to turn the members of each unit first in one direction and then in the other relative to each other, means operable in timed relation to the turning of the carrier to deliver a nut blank into each of said chuck members, means subsequently operating during relative turning of said members by said racks to advance the members axially toward each other and cause the tapping member to thread the blank held in the chuck member and then away from each other to screw the tap out of the threaded blank, the end portion of each rack first engaged by said gear means being movable into and out of alinement with the remaining portion of the rack, and yieldable means normally holding said movable rack portions in alinement with each other.

4. In a machine for tapping the holes in polygonal nut blanks having coned recesses in opposite sides, the combination of, a carrier continuously rotatable about a fixed axis, a chuck mounted on said carrier with its axis parallel to said carrier axis and having a socket adapted to receive and hold one of said blanks against turning and opening toward a transaxial plane of the carrier, a pickup element concentric with said chuck on the same side of said plane, a combined tap and blank holding member alined axially with said chuck and said element and disposed on the opposite side of said plane therefrom, said member having a reduced end adjacent said plane for entry into one of said recesses of a blank, a chute supporting a row of said blanks with the terminal blank disposed in said plane and on the cylinder traversed by said chuck axis, said chute having an opening facing in the direction of turning of said carrier to permit escape of said terminal blank, mechanism operable in synchronism with the turning of said carrier to relatively shift said member and said element axially to first enter the adjacent ends thereof in said recesses of said terminal blank for removal thereof from the chute through said opening and then relatively shift the member, the element, and the chuck axially and seat the held blank in said socket, subsequently operable means for relatively moving said member and said chuck axially toward and away from each other to feed the tap into and out of the held blank, and mechanism operable during said axial feeding and in synchronism therewith to relatively turn said tap and chuck in opposite directions to tap the hole in the blank and finally release the finished nut.

5. In a machine for tapping the holes in polygonal nut blanks having coned recesses in opposite sides, the combination of, a carrier continuously rotatable about a fixed horizontal axis, a tap and a chuck axially alined wtih each other on opposite sides of a transaxial plane of said carrier axis, the end of said tap adjacent said chuck constituting a first gripping element, a chute supporting a row of said blanks with the terminal blank disposed in said plane and on the circle traversed by said tap and chuck axis, said chuck forming a socket for receiving and holding one of said blanks, said chute having an opening facing circumferentially of said carrier, a second gripping element concentric with said chuck and mounted for movement axially relative to the chuck and toward and away from said plane and said first element, mechanism operable in timed relation to the rotation of said carrier to project said elements into the recesses of the terminal blank held in said chute whereby to transfer such blank out of the chute through said opening while holding the blank in alinement with said chuck, means operable in synchronism with the turning of said carrier to relatively move said elements and said chuck axially to first seat the held blank in said socket and then feed said tap into and out of the hole in the chucked blank, mechanism operable during said axial feeding and in synchronism therewith to relatively turn said tap and chuck in opposite directions to thread said hole and release the finished nut, and subsequently operating means for shifting said second gripping element axially to eject said nut from said chuck.

6. A machine for tapping the holes in polygonal nut blanks having coned recesses in opposite sides, said machine having, in combination, a carrier continuously rotatable about a horizontal axis, a plurality of gripping and tapping units mounted on said carrier parallel to said axis and spaced apart equidistantly therearound, each of said units comprising opposed pick off and holding elements mounted for axial movement toward and away from a transaxial plane of the carrier and a tap and a chuck concentric with the axis of the respective elements, said chuck forming a socket for receiving and holding one of said blanks, a chute supporting a row of said blanks with the terminal blank disposed in said plane between said elements of each pair and on the cylinder traversed by the axis of the elements, said chute having a circumferentially facing opening, mechanism operable in timed relation to the rotation of said carrier to project said elements into the recesses of said terminal blank, chuck the picked up blank in said socket and then feed said tap into and out of the hole in the chucked blank, mechanism operable during such axial feeding and in synchronism therewith to relatively turn said tap and chuck in opposite directions to thread said hole and release the finished nut, and subsequently operating means for shifting said second gripping element axially and eject said nut from said chuck.

7. In a machine for tapping polygonal blanks having inwardly converging recesses in opposite sides, the combination of, means supporting and advancing a row of said blanks to a predetermined terminal position in a plane, a carrier rotatable about an axis paralleling the axis of the blank in said terminal position, said supporting means having a circumferentially facing opening, alined gripping elements mounted on said carrier on opposite sides of said plane for axial movement toward and away from said plane and for transverse movement with the carrier through a position of axial alinement with said terminal blank, a chuck surrounding one of said elements and having a multi-sided socket which complements and registers with the periphery of said terminal blank when passing said terminal position, mechanism operable in synchronism with the turning of said carrier to relatively shift said member and said element axially to first enter the adjacent ends thereof in said recesses of said terminal blank for removal thereof from the chute through said opening and then relatively shift the member, the element, and the chuck axially and seat the held blank in said socket, subsequently operable means for relatively moving said member and said chuck axially toward and away from each other to feed the tap into and out of the held blank, and mechanism operable during said axial feeding and in synchronism therewith to relatively turn said tap and chuck in opposite directions to tap the hole in the blank and finally release the finished nut.

References Cited in the file of this patent

UNITED STATES PATENTS

| Number | Name | Date |
|---|---|---|
| 372,541 | Kennedy | Nov. 1, 1887 |
| 800,350 | Aasland | Sept. 26, 1905 |
| 1,021,242 | Fishburne | Mar. 26, 1912 |
| 1,141,779 | Daniels | June 1, 1915 |
| 1,495,930 | Sing | May 27, 1924 |
| 1,521,234 | Ehrman | Dec. 30, 1924 |
| 1,990,188 | Kabbel | Feb. 5, 1935 |
| 2,438,363 | Friedman | Mar. 23, 1948 |